(12) United States Patent
Kim et al.

(10) Patent No.: US 8,421,436 B2
(45) Date of Patent: Apr. 16, 2013

(54) STEP-DOWN CONVERTER MAINTAINING STABLE OPERATION AT START UP

(75) Inventors: Hyung-wan Kim, Suwon-si (KR);
Hyeong-sik Choi, Suwon-si (KR);
Gil-yong Chang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 691 days.

(21) Appl. No.: 12/635,018

(22) Filed: Dec. 10, 2009

(65) Prior Publication Data

US 2010/0141227 A1 Jun. 10, 2010

(30) Foreign Application Priority Data

Dec. 10, 2008 (KR) .................. 10-2008-0125387

(51) Int. Cl.
*H02M 3/155* (2006.01)
(52) U.S. Cl.
USPC .......................... 323/351; 323/299

(58) Field of Classification Search ............... 323/282, 323/285, 299, 351
See application file for complete search history.

(56) References Cited

U.S. PATENT DOCUMENTS

| | | | |
|---|---|---|---|
| 6,094,039 A * | 7/2000 | Farrenkopf | 323/283 |
| 6,362,608 B1 * | 3/2002 | Ashburn et al. | 323/272 |
| 8,076,920 B1 * | 12/2011 | Melanson | 323/299 |
| 2002/0175661 A1 * | 11/2002 | Wheeler et al. | 323/282 |
| 2006/0017423 A1 * | 1/2006 | Frith et al. | 323/268 |
| 2010/0141227 A1 * | 6/2010 | Kim et al. | 323/282 |
| 2011/0148373 A1 * | 6/2011 | Canfield et al. | 323/282 |
| 2011/0187340 A1 * | 8/2011 | Deval et al. | 323/285 |

* cited by examiner

*Primary Examiner* — Jeffrey Sterrett
(74) *Attorney, Agent, or Firm* — Sughrue Mion, PLLC

(57) ABSTRACT

A step-down converter is provided. The step-down converter includes a DC-DC converter including a boost capacitor and an NMOS transistor, the DC-DC converter converting an input direct current (DC) voltage to an output DC voltage; and an electric discharge circuit which adjusts the output voltage to be less than or equal to the input voltage.

18 Claims, 5 Drawing Sheets

US 8,421,436 B2

STEP-DOWN CONVERTER MAINTAINING STABLE OPERATION AT START UP

CROSS-REFERENCE TO RELATED APPLICATIONS

This application claims priority from Korean Patent Application No. 10-2008-125387, filed Dec. 10, 2008, in the Korean Intellectual Property Office, the disclosure of which is incorporated herein by reference in its entirety.

BACKGROUND OF THE INVENTION

1. Field of the Invention

Apparatuses and methods consistent with the present invention relate to a step-down converter and a power supply, and more particularly, to a step-down converter and a power supply which can be stably operated at a time of an initial start up by outputting a voltage lower than an input voltage.

2. Description of the Related Art

In general, a power supply converts electric power supplied from an external source in accordance with a demand of an internal system and supplies the converted electric power. An example of such a power supply includes a switched-mode power supply.

The switched-mode power supply controls the flow of electric power using a switching process of a semiconductor element. Because the switched-mode power supply has high efficiency, small size, and light weight, it is widely used for electric, electronic, and communication apparatuses.

A DC-DC converter is an example of the switched-mode power supply. The DC-DC converter converts a direct current (DC) voltage from one level to another level. There are various types of DC-DC converters for outputting a desired voltage based on an input voltage, such as, for example, a buck or step-down converter, a boost converter, and a fly back converter.

The step-down converter outputs an output voltage lower than an input voltage. The step-down converter has a switching element and an energy storage element to perform switching operation and generate an output voltage lower than an input voltage. An N-channel Metal Oxide Semiconductor (NMOS) transistor may be used as a switching element of the step-down converter because of the ease of integration and low price.

In order to perform the switching operation, the NMOS transistor should have a gate voltage Vgs greater than a threshold voltage. Therefore, the step-down converter using the NMOS transistor employs a boost capacitor and uses a voltage charged in the boost capacitor in the switching operation as a gate driver power of the NMOS transistor.

One drawback of a related art step-down converter is that an input voltage may become lower than an output voltage depending on the load conditions of an input and an output after completing the converting operation.

FIG. 5A illustrates a waveform diagram of an input voltage $V_{in}$ and an output voltage $V_{out}$ when the electric power is interrupted in a related art step-down converter. As shown in FIG. 5A, if the electric discharge of an input is faster than that of an output, the output voltage becomes greater than the input voltage after a time $T_1$. At this time, if the step-down converter begins to operate, the boost capacitor cannot perform charging operation in the state that the output voltage is greater than the input voltage. Accordingly, the operation of the step-down converter may result in a fault.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a step-down converter and a power supply which provide an output voltage of the step-down converter lower than an input voltage even when the converting operation of the step-down converter is completed, thereby maintaining stable operation of the power supply and the step-down converter at a time of an initial start up.

According to an aspect of the present invention, there is provided a step-down converter including: a DC-DC converter which performs DC-DC converting using a boost capacitor and a NMOS transistor, and an electric discharge circuit which makes a voltage of an output of the DC-DC converter less than or equal to a voltage of an input of the DC-DC converter.

The electric discharge circuit may include a voltage divider which divides the voltage of the input, and a diode which discharges the voltage of the output if the voltage divided by the voltage divider is less than or equal to a pre-set voltage.

The voltage divider may include a first resistor which is provided at the input, and a second resistor which is connected to the first resistor in series.

The diode may have an anode end connected to one side of the output and a cathode end connected to a node between the first resistor and the second resistor.

If the DC-DC converter performs DC-DC converting operation, a node voltage between the first resistor and the second resistor may be greater than or equal to a voltage value equaling the voltage of the output minus a threshold voltage of the diode.

The electric discharge circuit may make the voltage of the output less than or equal to the voltage of the input if the DC-DC converting operation of the DC-DC converter is completed.

The DC-DC converter may include a NMOS transistor which performs switching operation using a boost capacitor, an inductor and a capacitor which accumulate energy according to turn-on of the NMOS transistor, and a switching unit which forms a loop between the inductor and the capacitor when the NMOS transistor is turned on.

According to another aspect of the present invention, there is provided a power supply including: a power supply unit which supplies a DC voltage, and a step-down converter which has a boost capacitor and an NMOS transistor and performs DC-DC converting operation if a DC voltage is supplied from the power supply unit, and the step-down converter may include an electric discharge circuit which makes a voltage of an output of the step-down converter less than or equal to a voltage of an input of the step-down converter.

The electric discharge circuit may include a voltage divider which divides the voltage of the input; and a diode which discharge the voltage of the output if the voltage divided by the voltage divider is less than or equal to a pre-set voltage.

The voltage divider may include a first resistor which is provided at the input, and a second resistor which is connected to the first resistor in series.

The diode may have an anode end connected to one side of the output and a cathode end connected to a node between the first resistor and the second resistor.

If a DC voltage is supplied from the power supply unit, a node voltage between the first resistor and the second resistor may be greater than or equal to a voltage value which equals the voltage of the output minus a threshold value of the diode.

The voltage divider may make the voltage of the output less than or equal to the voltage of the input if electric power supplied from the power supply unit is interrupted.

The step-down converter may include a NMOS transistor which performs switching operation with respect to the DC voltage of the power supply unit using a boost capacitor, an inductor and a capacitor which accumulate energy according to turn-on of the NMOS transistor, and a diode which forms a loop between the inductor and the capacitor when the NMOS transistor is turned on.

BRIEF DESCRIPTION OF THE DRAWINGS

The above and/or other aspects of the present invention will become more apparent by describing certain exemplary embodiments of the present invention with reference to the accompanying drawings, in which.

DETAILED DESCRIPTION OF EXEMPLARY EMBODIMENTS

Figure 1:
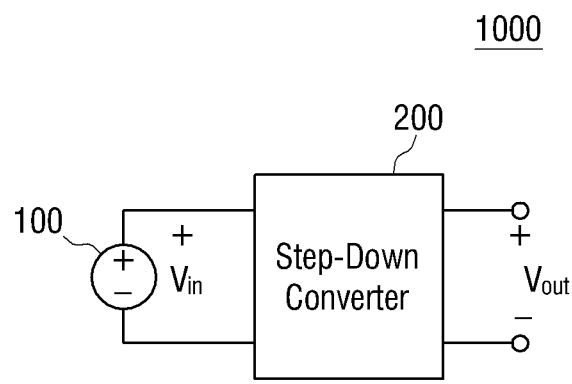
FIG. 1 illustrates a power supply in accordance with an exemplary embodiment of the present invention.

Exemplary embodiments of the present invention are described in greater detail below with reference to the accompanying drawings.

In the following description, like drawing reference numerals are used for the like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

FIG. 1 is a diagram illustrating a power supply in accordance with an exemplary embodiment of the present invention.

Referring to FIG. 1, a power supply 1000 includes a power supply unit 100 and a step-down converter 200.

The power supply unit 100 supplies a DC voltage. More specifically, the power supply unit 100 serves as a DC voltage source to supply an input DC voltage $V_{in}$ to the step-down converter 200. For example, the power supply unit 100 may be implemented as a storage battery to supply a DC voltage of a predetermined level or may be implemented as an AC-DC converter to convert an alternating current (AC) voltage into a DC voltage.

The step-down converter 200 outputs an output voltage $V_{out}$ lower than the input voltage $V_{in}$. Detailed configuration and operation of the step-down converter 200 is described below with reference to FIG. 2.

Figure 2:
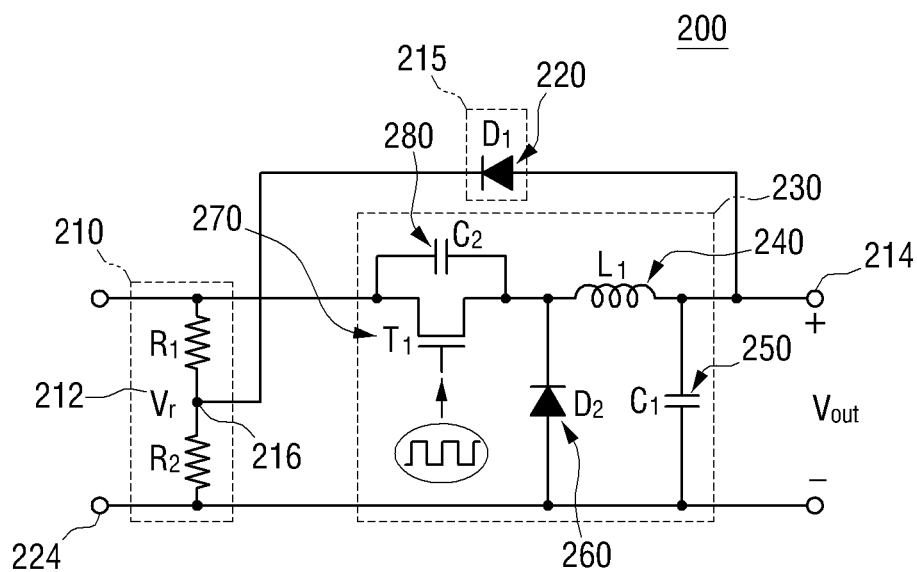
FIG. 2 illustrates a circuit diagram of a step-down converter in accordance with an exemplary embodiment of the present invention.

FIG. 2 is a circuit diagram of the step-down converter 200 in accordance with an exemplary embodiment of the present invention.

Referring to FIG. 2, the step-down converter 200 includes a DC-DC converter 230 and first and second electric discharge circuits 210 and 215.

The DC-DC converter 230 outputs a DC voltage lower than an input DC voltage. More specifically, the DC-DC converter 230 includes an NMOS transistor 270 ($T_1$) which performs switching operation with respect to the input voltage $V_{in}$ using a boost capacitor 280 ($C_2$), inductor 240 ($L_1$) and a capacitor 250 ($C_1$) which accumulates energy and supplies the accumulated energy to the output according to the switching operation of the NMOS transistor 270. A diode 260 ($D_2$) forms a loop between the inductor 240 and the capacitor 250 according to the switching operation of the NMOS transistor 270.

The boost capacitor 280 is connected between a source and a drain of the NMOS transistor 270. Accordingly, when the electric power is supplied to the DC-DC converter 230, the boost capacitor 280 is electrically charging, so that the voltage is generated in the boost capacitor 280 by the electric charge. The voltage generated in the boost capacitor 280 in the switching operation is used as a gate driver power source of the NMOS transistor 270. Detailed operation of the DC-DC converter 230 is described below with reference to FIGS. 3 and 4.

The first and second electric discharge circuits 210 and 215 generate the output voltage $V_{out}$ of the DC-DC converter 230 less than or equal to the input voltage $V_{in}$ of the DC-DC converter 230. More specifically, the first and second electric discharge circuits 210 and 215 respectively include a voltage divider 212 and a diode 220 ($D_1$). The electric charge accumulated at the output of the DC-DC converter 230 is discharged through the voltage divider 212 so that the output voltage $V_{out}$ of the DC-DC converter 230 is less than or equal to the input voltage $V_{in}$ of the DC-DC converter 230.

The voltage divider 212 divides the input voltage $V_{in}$. More specifically, the voltage divider 212 divides the input voltage using a first resistor $R_1$ and a second resistor $R_2$ which are coupled in series between first and second input terminals 222 and 224. In this case, a node voltage $V_r$ divided by the voltage divider 212 between the first resistor $R_1$ and the second resistor $R_2$ has a voltage value:

$$V_r = \frac{R_2}{R_1 + R_2} \quad (1)$$

where $V_r$ is a node voltage between the first resistor $R_1$ and the second resistor $R_2$, $R_1$ is a resistance value of the first resistor, and $R_2$ is a resistance value of the second resistor.

The diode 220 $D_1$ forms a path to discharge the electric charge accumulated at the output if the voltage divided by the voltage divider 212 is less than or equal to a pre-set voltage ($V_{out}-V_f$). More specifically, the diode 220 $D_1$ has an anode connected to an output line 214 and a cathode connected to a node 216 between the first resistor $R_1$ and the second resistor $R_2$. In general, since the diode 220 $D_1$ has a threshold voltage $V_f$ of about 0.5-0.7V, the electric current flows in the diode 220 $D_1$ if the voltage of the node 216 between the first resistor $R_1$ and the second resistor $R_2$ is less than or equal to the voltage value equal to a difference between the output voltage $V_{out}$ and the threshold voltage $V_f$ of the diode $D_1$. In this case, the operation of the diode 220 $D_1$ can be expressed as:

$$V_r \leq V_{out} - V_f \quad (2)$$

where $V_r$ is a node voltage between the first resistor $R_1$ and the second $R_2$,
$V_{out}$ is a voltage of the output, and
$V_f$ is a threshold voltage of the diode 220 $D_1$.

Accordingly, the resistance values of the first resistor $R_1$ and the second resistor $R_2$ are set such that the voltage $V_f$ of the node 216 between the first resistor $R_1$ and the second resistor $R_2$ is greater than the value equal to a difference between the output voltage $V_{out}$ and the threshold voltage of the diode 220 $D_1$ so as not to operate the electric discharge circuit through the diode $D_1$ when the power is supplied. That is, the resistance values of the first resistor $R_1$ and the second resistor $R_2$ are set such that no electric current flows in the diode 220 $D_1$ at a power up. For example, if the input voltage supplied to the input is 10 V and the output voltage set in the output is 5V, and if the voltage divided by the voltage divider 212 is greater than about 4.5 V (output voltage $V_{out}$ minus threshold voltage $V_f$ of the diode), no electric current flows in the diode 220 $D_1$. The resistance values of the first resistor $R_1$ and the second resistor $R_2$ are set to satisfy the following equation:

$$R_2 \geq \frac{5.5}{4.5} R_1 \qquad (3)$$

where $R_1$ is a resistance value of the first resistor, and
$R_2$ is a resistance value of the second resistor.

Figure 3:
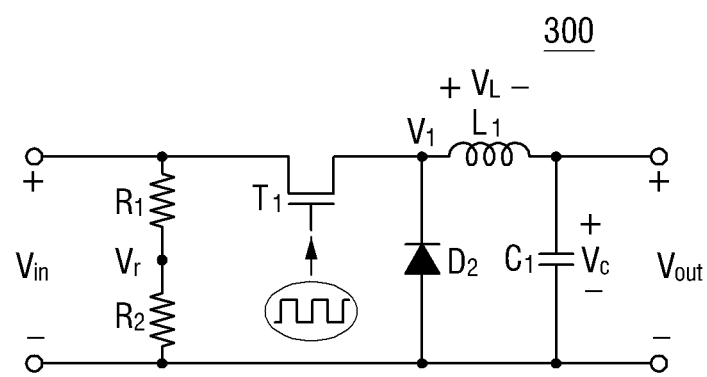
FIG. 3 illustrates an equivalent circuit of the step-down converter when electric power is supplied.

Accordingly, no electric current flows through the diode 220 $D_1$ when the electric power is supplied to the step-down converter 200 as illustrated in the equivalent circuit 300 of FIG. 3. On the contrary, electric current flows through the diode 220 $D_1$ when the electric power is interrupted as illustrated in the equivalent circuit 400 of FIG. 4.

The operation of the step-down converter 200 is described below using the equivalent circuit according to the power status of the input of the step-down converter 200.

FIG. 3 illustrates an equivalent circuit 300 of the step-down converter 200 when electric power is supplied.

Referring to FIG. 3, the NMOS transistor $T_1$ performs a switching operation at period T to repeat on-off operations. More specifically, if the NMOS transistor $T_1$ is turned on, electric current flows in the inductor $L_1$ and energy is stored in the inductor $L_1$ and the capacitor $C_1$. At this time, the voltage at the cathode of the diode $D_2$ becomes greater than the voltage at the anode such that no electric current flows in the diode $D_2$. In this case, the variation of the electric current $i_L$ flowing in the inductor $L_1$ is:

$$V_{in} = V_L + V_C = L\frac{di_L}{dt} + V_C \qquad (4)$$

where $V_{in}$ is an input voltage,
$V_L$ is a voltage of the inductor $L_1$,
$V_C$ is a voltage of the capacitor $C_1$, and
L is an inductance of the inductor $L_1$.
Equation 4 can be expressed as:

$$\frac{di_L}{dt} = \frac{V_{in} - V_C}{L} \qquad (5)$$

That is, it can be seen from Equation 5 that the inductor current $i_L$ of the step-down converter 200 increases with a constant gradient during the turn-on time DT.

On the other hand, if the NMOS transistor $T_1$ is turned off, a loop is formed through the inductor $L_1$, the capacitor $C_1$ and the diode $D_2$ by the energy accumulated at the capacitor $C_1$ and the inductor $L_1$. In this case, the variation of the electric current $i_L$ flowing in the inductor $L_1$ is:

$$0 = V_L + V_C = L\frac{di_L}{dt} + V_C \qquad (6)$$

where $V_{in}$ is an input voltage,
$V_L$ is a voltage of the inductor $L_1$,
$V_C$ is a voltage of the capacitor $C_1$, and
L is an inductance of the inductor $L_1$.
Equation 6 can be expressed as:

$$\frac{di_L}{dt} = \frac{-V_C}{L} \qquad (7)$$

That is, it can be seen from Equation 7 that the electric current $i_L$ of the inductor of the step-down converter 200 decreases with a constant gradient during the turn-off time (T-DT).

At this time, since the NMOS transistor $T_1$ of the DC-DC converter 200 periodically repeats a switching operation, the final value of the inductor electric current $i_L$ is an initial value of the next period, which is expressed as:

$$I_{MAX} - I_{MIN} = \left(\frac{V_{in} - V_C}{L}\right)DT = \left(\frac{-V_C}{L}\right)(1-D)T \qquad (8)$$

where $I_{MAX}$ is a maximum value of the inductor electric current,
$I_{MIN}$ is a minimum value of the inductor electric current,
$V_{in}$ is an input voltage,
$V_C$ is a voltage of the capacitor $C_1$,
L is an inductance of the inductor $L_1$,
DT is a turn-on time, and
(1-D)T is a turn-off time.
Equation 8 can be expressed as:

$$V_C = DE \qquad (9)$$

It can be seen from Equation 9 that the step-down converter 200 outputs a direct current output voltage (DE) which is lower than the direct current input voltage $V_{in}$. Also, it can be seen that the output voltage $V_{out}$ and the input voltage $V_{in}$ have a linear relationship.

Figure 4:
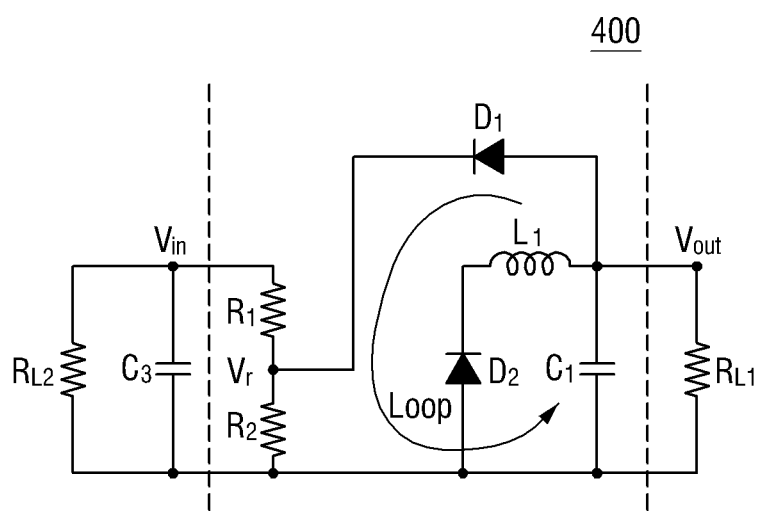
FIG. 4 illustrates an equivalent circuit of the step-down converter when electric power is interrupted.

FIG. 4 illustrates an equivalent circuit 400 of the step-down converter 200 when electric power is interrupted.

Referring to FIG. 4, when the electric power of the input is interrupted, the NMOS transistor $T_1$ is turned off. The node voltage between the first resistor $R_1$ and the second resistor $R_2$ becomes lower. Accordingly, the electric current flows in the diode $D_1$ and energy stored to the output is discharged. In this case, the relationship between the output voltage and the input voltage is:

$$V_{OUT} = V_R - V_f = V_{in} * \frac{R_1}{R_1 + R_2} - V_j \qquad (10)$$

$$\text{where } V_R = \frac{R_1}{R_1 + R_2} * V_{in}$$

That is, it can be seen from Equation 10 that the output voltage $V_{out}$ is discharged when the input voltage $V_{in}$ is divided and, thus, may be automatically adjusted lower than the input voltage Although the discharge speed of the resistor $R_{L2}$ and the capacitor $C_3$ connected to the input is faster than that of the resistor $R_{L1}$ and the capacitor $C_1$ connected to the output as shown in the right and the left sides with reference to the dotted lines of FIG. 4, the step-down converter 200 discharges the electric charge from the output through an additional electric discharge circuit as described above so that the output voltage $V_{out}$ is adjusted lower than the input voltage $V_{in}$.

Figure 5A:
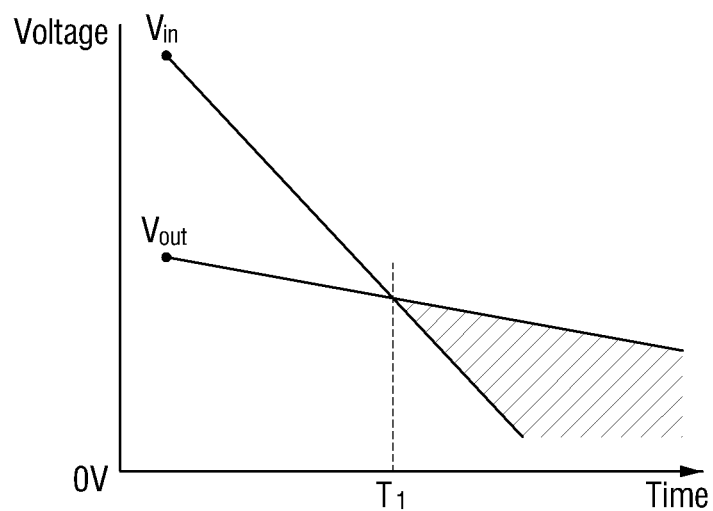
FIG. 5A illustrates a waveform diagram of an input voltage and an output voltage when electric power is interrupted in a general step-down converter.
Figure 5B:
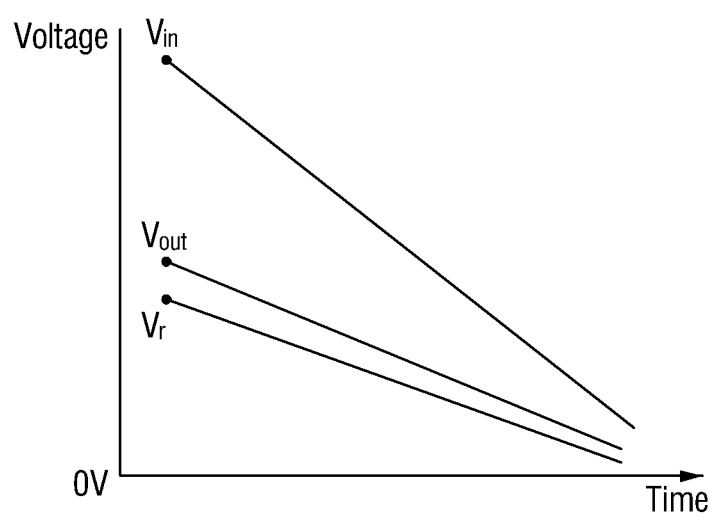
FIG. 5B illustrates a waveform diagram of an input voltage and an output voltage when electric power is interrupted in a step-down converter in accordance with an exemplary embodiment of the present invention.

FIG. 5B illustrates a waveform diagram of the input voltage $V_{in}$ and the output voltage $V_{out}$ when the electric power is interrupted in the step-down converter 200 according to an exemplary embodiment of the present invention. As shown in FIG. 5B, as the electric power of the output $V_{out}$ decreases in proportion to that of the input $V_{in}$ if the electric power supplied through the input is interrupted, the step-down converter 200 outputs the output voltage $V_{out}$ lower than the input voltage $V_{in}$, thereby stably initiating step-down converting.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A step-down converter comprising:
a DC-DC converter comprising a boost capacitor and an NMOS transistor, the DC-DC converter converting an input direct current (DC) voltage to an output DC voltage; and
an electric discharge circuit which adjusts the output voltage to be less than or equal to the input voltage, the electric discharge circuit comprising:
a voltage divider which divides the input voltage, and
a diode which discharges the output voltage if the voltage divided by the voltage divider is less than or equal to a pre-set voltage value.

2. The step-down converter as claimed in claim 1, wherein the NMOS transistor performs switching operation using the boost capacitor, and the DC-DC converter further comprises:
an inductor and a capacitor which accumulate energy when the NMOS transistor is in a turn on state; and
a switching unit which forms a loop between the inductor and the capacitor when the NMOS transistor is turned off.

3. The step-down converter as claimed in claim 1, wherein the voltage divider comprises:
a first resistor; and
a second resistor, wherein the first and second resistors are connected in series between first and second input terminals.

4. The step-down converter as claimed in claim 3, wherein the diode comprises an anode connected to an output terminal and a cathode connected to a node between the first resistor and the second resistor.

5. The step-down converter as claimed in claim 4, wherein, during a DC-DC converting operation performed by the DC-DC converter, a voltage value at the node between the first resistor and the second resistor is maintained greater than or equal to a voltage value equal to a difference between the output voltage and a threshold voltage of the diode.

6. The step-down converter as claimed in claim 5, wherein the electric discharge circuit adjusts the output voltage to be less than or equal to the input voltage if the DC-DC converting operation of the DC-DC converter is completed.

7. A power supply comprising:
a power supply unit which supplies an input DC voltage; and
a step-down converter which converts the input DC to an output DC voltage, the step-down converter comprising:
a boost capacitor;
an NMOS transistor connected in parallel to the boost capacitor; and
an electric discharge circuit which is connected to the boost capacitor and the NMOS transistor, and adjusts the output voltage to be less than or equal to the input voltage.

8. The power supply as claimed in claim 7, wherein the NMOS transistor which performs switching operation with respect to the DC voltage of the power supply unit using the boost capacitor, and the step-down converter further comprises:
an inductor and a capacitor which accumulate energy when the NMOS transistor is in a turn on state; and
a diode which forms a loop between the inductor and the capacitor when the NMOS transistor is turned off.

9. The power supply as claimed in claim 7, wherein the electric discharge circuit comprises:
a voltage divider which divides the input voltage; and
a diode which discharges the output voltage if the voltage divided by the voltage divider is less than or equal to a pre-set voltage.

10. The power supply as claimed in claim 9, wherein the voltage divider comprises:
a first resistor; and
a second resistor, wherein the first and second resistors are connected in series between first and second input terminals.

11. The power supply as claimed in claim 10, wherein the diode comprises an anode connected to an output line and a cathode connected to a node between the first resistor and the second resistor.

12. The power supply as claimed in claim 11, wherein during a DC-DC converting operation performed by the step-down converter, a voltage at a node between the first resistor and the second resistor is maintained greater than or equal to a voltage value which equals a difference between the output voltage and a threshold value of the diode.

13. The power supply as claimed in claim 7, wherein the voltage divider adjusts the output voltage to be less than or equal to the input voltage if electric power supplied from the power supply unit is interrupted.

14. A power supply comprising:
an input power supply which supplies an input direct current (DC) voltage;
a DC-DC converter which converts the input DC voltage to an output DC voltage of a lower value than an input voltage value, the DC-DC converter comprising:
a boost capacitor which is coupled between an input terminal and an output terminal, and
an NMOS transistor which is coupled in parallel to the boost capacitor; and
an electric discharge circuit which is coupled to the DC-DC converter, and adjusts the output voltage value to be less than or equal to the input voltage value when a DC-DC converting operation is interrupted.

15. The power supply as claimed in claim 14, wherein the DC-DC converter further comprises:

an inductor coupled in series with a capacitor between the output line and an output ground line, wherein the inductor and the capacitor accumulate energy when the NMOS transistor is in a turn on state; and a diode coupled between the inductor and the output ground line to form a loop between the inductor and the capacitor when the NMOS transistor is turned off.

16. The power supply as claimed in claim 15, wherein the electric discharge circuit comprises:

a voltage divider which divides the input voltage value to receive a divider voltage value and comprises:
a first resistor coupled to the first input line, and
a second resistor coupled to a second input line and in series to the first resistor; and a diode coupled to the output line and the node, which diode discharges the output voltage if the divider voltage value is less than or equal to a pre-set voltage value.

17. The power supply as claimed in claim 16, wherein the voltage divider and the diode operate to generate a voltage value at a node between the first and second resistors which is greater than or equal to a voltage value equal to a difference between the output voltage and a threshold voltage of the diode during the DC-DC converting operation.

18. The power supply as claimed in claim 17, wherein the voltage divider and the diode operate to generate the output voltage which is less than or equal to the input voltage value when the DC-DC converting operation is interrupted.

* * * * *